United States Patent [19]

Gonzalez

[11] Patent Number: 5,413,355
[45] Date of Patent: May 9, 1995

[54] ELECTRONIC EDUCATIONAL GAME WITH RESPONSIVE ANIMATION

[76] Inventor: Carlos Gonzalez, Calle H 472, Urb. Constancia, Ponce, Puerto Rico, 00731

[21] Appl. No.: 169,320
[22] Filed: Dec. 17, 1993
[51] Int. Cl.[6] .................................................. A63F 9/00
[52] U.S. Cl. ............................ 273/429; 273/430; 273/302; 273/460; 434/308; 434/321; 434/335
[58] Field of Search ............ 273/237, 439, 460, 85 G, 273/302; 434/308, 309, 311, 321, 327, 335, 339

[56] References Cited

U.S. PATENT DOCUMENTS

| | | | |
|---|---|---|---|
| 3,696,525 | 10/1979 | Cleary | 434/311 |
| 4,373,918 | 2/1983 | Berman | 434/309 |
| 4,521,205 | 6/1985 | Spector | 446/302 |
| 4,681,548 | 7/1987 | Lemelson | 434/311 |
| 4,729,564 | 3/1988 | Kuna et al. | 434/311 |
| 4,799,678 | 1/1989 | Terzian et al. | 273/237 |
| 4,824,376 | 4/1989 | Arash | 434/327 |
| 4,846,693 | 7/1989 | Baer | 434/308 |
| 5,122,062 | 7/1992 | Cutler et al. | 434/327 |
| 5,163,844 | 11/1992 | Hollis, Jr. et al. | 434/327 |
| 5,263,865 | 11/1993 | Zipf | 434/309 |
| 5,277,588 | 1/1994 | Lin | 434/335 |

Primary Examiner—Vincent Millin
Assistant Examiner—Kerry H. Owens
Attorney, Agent, or Firm—Melvin I. Stoltz

[57] ABSTRACT

A substantially improved electronically controlled educational toy or game is achieved by providing animated indicia which is directly responsive to the input signals provided by the user. Preferably, the animated indicia comprises a distinctive character which produces animated movements of approval in response to questions being answered correctly, while producing a negative animated reaction to an incorrect answer. By providing this unique animated response in combination with audible and visual indicia, an educational toy and game is attained which creates added excitement and interest for children.

17 Claims, 6 Drawing Sheets

ELECTRONIC EDUCATIONAL GAME WITH RESPONSIVE ANIMATION

TECHNICAL FIELD

This invention relates to educational toys and games and, more particularly, to electronic educational toys and games for children which entertain the user while also providing education.

BACKGROUND ART

With the ever increasing capabilities being achieved by improved circuit boards, numerous educational toys and games have been created in an attempt to bring greater fun and excitement into educational games. Typically, most prior art toys and educational games using electronics or printed circuit boards employ LED's or lights as a visual aid while also employing sound as an audible aid. With both LED'S and sounds being employed in combination with each other, electronic circuitry is constructed to provide various challenges to the child, with visual and audible responses being used for enhanced excitement.

One common form of prior art educational games is the use of an electronic panel which is activated by touch. By employing this touch panel various questions are printed on a sheet overlay for the panel for being asked of the child. Answers are made by pressing designated zones of the panel with correct answers providing a visual and/or audible response.

By employing a variety of circuit configurations, all of which are well known in the art, panels can be constructed to vary the relative positions of questions and answers on different overlays. In this way, answers to questions cannot be immediately determined by repeating the position of an answer which was used on a previous overlay.

Although these prior art systems have enjoyed some success in providing challenging educational games for children with some added excitement being provided by the LED displays and/or the audible sounds, these games have been incapable of maintaining the interest level of most children. Typically, children become tired or bored with the limited visual and audible feedback and begin to treat the game as a mere educational toy without sufficient fun or excitement.

Consequently, it is a principal object of the present invention to provide an educational electronic game which is capable of providing added fun and excitement for children to assure that their interest will be held for extended periods of time.

Another object of the present invention is to provide an electronic educational game having the characteristic features described above which provides both audible and visual excitement, as with prior art systems, while also providing animation which is responsive to the accuracy of a child's response.

Another object of the present invention is to provide an electronic educational game having the characteristic features described above which further incorporates a doll member which produces animated movement in direct response to the accuracy or inaccuracy of a child's answers to questions being posed.

A further object of the present invention is to provide an animated electronic educational game having the characteristic features described above which is capable of being easily understood and used by children of all ages, with game cards being quickly and easily inserted into the game for use by all children.

Another object of the present invention is to provide an animated electronic educational game having the characteristic features described above which is capable of being employed with a wide variety game cards which are constructed with varying levels of difficulty to assure that children having different educational levels are continuously being challenged.

Another object of the present invention is to provide an animated electronic educational game having the characteristic features described above which is capable of being operated in a plurality of alternate sequences or patterns to eliminate repetitive positioning of question and answer combinations.

Other and more specific objects will in part be obvious and will in part appear hereinafter.

SUMMARY OF THE INVENTION

The present invention overcomes all of the prior difficulties by providing an electronically controlled educational toy and game which is capable of achieving substantially improved and enhanced audible and visual excitement for the user, while also providing unique, responsive animation directly responsive to user input. In the present invention, enjoyment and interest by children is optimized by providing a visually pleasing character, the movement of which is directly controlled by the input panel of the electronic educational game.

Preferably, the animated, controlled movement of the character is responsive to the accuracy or inaccuracy of the child's answers. In this way, the user is able to immediately identify correct and incorrect responses to questions, while getting positive reinforcement for all responses by the animated movements of the character, as well as the audible and visual indicia cooperatively associated with the educational game.

In employing the teaching of the present invention, a plurality of alternate constructions can be created without departing from the scope of the present invention. However, for purposes of exemplifying the unique, distinctive, and valuable attributes attained by the present invention, the preferred embodiment of this invention is fully detailed herein. In accordance with this preferred embodiment, the toy or game comprises a housing within which is mounted all of the electronics and power means required for operating the educational game. Included in this electronic system is a printed circuit board which completely controls the operation of the audible and visual reinforcing indicia, as well as the animation of the character associated therewith.

In the preferred embodiment, the character comprises a unique, distinctive, and readily identifiable figure which is friendly appearing and capable of providing a positive response for correct answers and a negative response for incorrect answers. The positive response is preferably effectuated by having the character clap its hands together while nodding its head approvingly. In order to provide a negative response indicating an incorrect answer, the character moves its head from side to side, exhibiting a typical response of "no".

In addition to providing an animated figure which enhances fun, excitement and interest for any child using the game, the attainment of the animated character as provided in the present invention which is capable of producing at least two separate and distinct animated responses achieves positive reinforcement for a child employing the educational game of the present invention by showing one response for correct answers and another response for incorrect answers. In this way, a child is able to enjoy the animated movements of the unique friendly character, while also obtaining positive approval from the character for correct answers and immediate visual knowledge when an incorrect answer is given.

In the preferred embodiment, the game of the present invention also provides audible and visual indicia for further enhancing and emphasizing the animated movements of the character. Preferably, a plurality of LEDs are employed for assisting the child during the use of the game as well as to provide illuminated sequential displays for further approval when a sequence of answers has been correctly achieved. In addition, audible means are also incorporated into the system for providing sound effects and/or musical tunes for further enhancing the enjoyment of the present invention.

Preferably, the game of the present invention incorporates a pressure responsive, signal generating input panel which incorporates a plurality of separate and independent input zones. Each input zone of the input panel is constructed for completing a circuit whenever a particular input zone has been pressed, for thereby transmitting a signal to the electronic circuitry that a particular zone has been pressed by the user. In this way, the electronic control system is capable of determining the questions being selected as well as the answers being provided to the selected questions.

In the preferred construction, a plurality of game cards are constructed for cooperative association with the input panel for providing an overlay thereto. Each of the game cards contains a plurality of questions and a plurality of answers for the questions. In order to employ this system, a child presses a question at the appropriately marked spot, thereby transmitting a signal to the electronic system for designating that particular question, with the next signal received generally representing the child's answer to the particular question.

Based upon the control circuitry, the system knows which input zone is the correct response for the selected question and provides appropriate indication when a signal is received from that zone. In this way, the response to each selected question is monitored for accuracy, with the electronics having the capability of generating the appropriate response. Preferably, suitable audible and visual responses are initiated, as well as causing the animated character to perform the appropriate animated response.

In the preferred construction, the control circuitry is constructed with a memory chip which contains a plurality of alternate patterns wherein the position of the zone which represents the correct response for a particular question zone is varied. In this way, the correct answer to a particular question zone is different for different game cards, thereby assuring that children are properly challenged, and are not able to automatically respond to a particular question by pressing one particular answer zone, without knowing the correct answer.

In the preferred embodiment, each of the game cards incorporates tabs extending therefrom which cooperate with a plurality of switches directly connected to the memory chip of the printed circuit board. By employing different combinations of switches as the means for selecting a particular response pattern, each card can be constructed in a manner to assure sufficient deviation between cards to provide the desired result.

The invention accordingly comprises the features of construction, combination of elements, and arrangement of parts which will be exemplified in the construction hereinafter set forth and the scope of the invention will be indicated in the claims.

THE DRAWINGS

For a fuller understanding of the nature and objects of the invention, reference should be had to the following detailed description taken in connection with the accompanying drawings in which.

DETAILED DESCRIPTION

By referring to FIGS. 1–10, along with the following detailed disclosure, the construction of the preferred embodiment of the animated, electronic, educational game or toy of the present invention can best be understood. It is also apparent from this disclosure, that the present invention can be effectuated in a plurality of alternate constructions, without departing from the scope of the present invention. Consequently, the preferred embodiment detailed in this disclosure is made for exemplary purposes only, and is not intended to limit the scope of the present invention to only this preferred embodiment.

As shown in the drawings, animated, electronic, educational game or toy 20 comprises two principal components, housing 21, and animated indicia 22. Housing 21 incorporates an enlarged input panel 24 forming the major portion of the top surface thereof. As detailed below, input panel 24 is constructed with a plurality of sensors responsive to pressing by the user in order to complete the circuit and activate an input signal.

Housing 21 also comprises a plurality of LED's 25 positioned adjacent input panel 24 for cooperative association therewith. LED's 25 are preferably employed for a dual purpose, providing visual indicators or cues to the user in response to the games being played, while also being employed as indicia of the accuracy or inaccuracy of answers being provided.

In order to further enhance the child's interest in educational game 20 of the present invention, housing 21 also incorporates a speaker 26 which is responsively connected to the control circuitry for providing audible indicia, such as sound effects or musical tunes in response to the use of game 20. In this way, further interest and reinforcement is provided to the child in response to the child's use of game 20.

Completing the overall construction of housing 21, switch means 27 is provided for activating and deactivating game 20, with light means 28 providing a positive indication whenever the game is in the "ON" mode. Finally, in the preferred embodiment, housing 21 is constructed with a handle portion 29 integrally formed therewith in order to enable the child to easily carry educational game 20 to any desired location for use and enjoyment.

As is fully detailed herein, animated indicia 22 is constructed to further enhance and interest children in the use of educational game 20 by providing animated movements thereof directly response to the child's use of educational game 20. As is apparent to those of ordinary skill in this art, animated indicia 22 may be made in any desired configuration or form. The only requirements, in accordance with the :present invention, is the ability of indicia 22 to provide at least two separate and distinct animated movements, with one movement responsive to the receipt of correct answers to questions being posed by game 20, while the second movement is employed in response to incorrect answers being inputted into panel 24.

As depicted throughout the drawings, indicia 22 is in the form of animated character 22 which is depicted as a friendly alien comprising a body portion 30, a movable arm 31, a non-movable arm 32, and a movable head 33.

As further detailed below, the preferred embodiment of the present invention indicates the receipt of a correct answer by having movable arm 31 pivot towards and away from fixed arm 32, emulating a clapping action, while simultaneously having head 33 move vertically up and down, emulating an approving nod or "yes" action. In response to the receipt of an incorrect answer, animated character 22 is constructed to move its head 33 sideways through its entire arc of motion, emulating the shaking of one's head in a "no" manner.

By employing this construction, animated electronic educational game 20 is capable of providing children with substantially enhanced excitement and positive reinforcement action. In addition to providing LED displays and audible responses to the actions taken by the child, animated character 22 provides a completely new and unique response to the child's actions providing animated movements which are directly controlled by the child's answers or actions with game 20.

Whenever a correct answer is provided by the child, animated character 22 provides an approving nod and applause, while responding to incorrect answers with a conventional shaking of the head. In this way, children are able to receive positive, direct animated movement, heretofore unobtainable with any prior art system. As a result, greater interest, excitement and enjoyment in the continued use of educational game 20 is realized.

Figure 3:
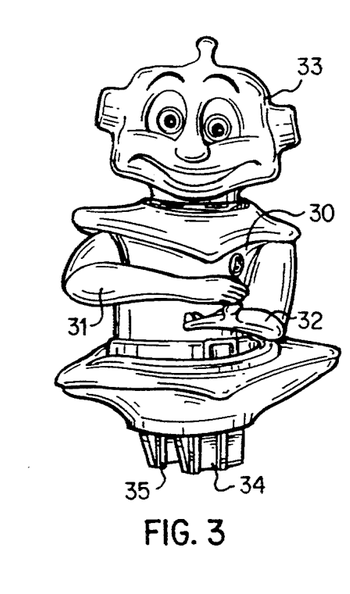
FIG. 3 is a left side elevation view of the animated character of the present invention.
Figures 4, 5:
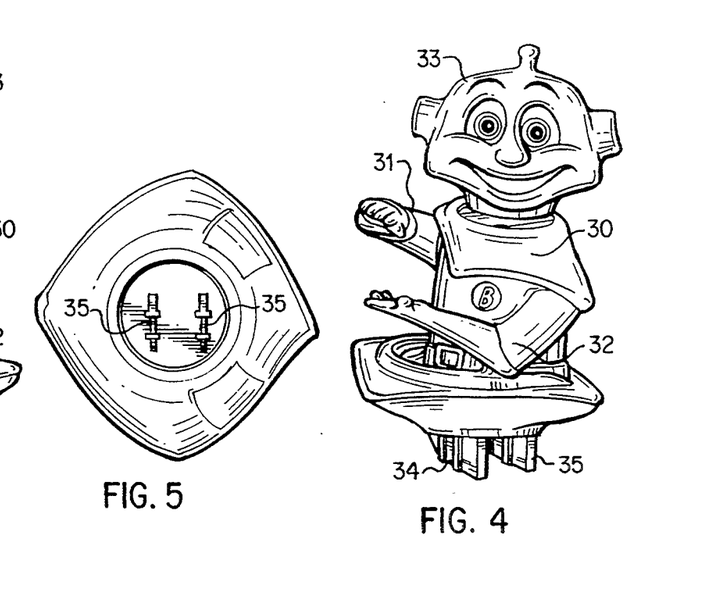
FIG. 4 is a right side elevation view of the animated character of the present invention.
FIG. 5 is a bottom plan view of the animated character depicting the connection means for mounted interengagement of the animated character with the game.

As best seen in FIGS. 3 and 4, movable arm 31 of animated character 22 is capable of pivoting from its raised position, shown in FIG. 4, to its lowered position, shown in FIG. 3, to bring the hands of character 22 into contact with each other. By raising and lowering arm 31 relative to fixed arm 32, the animated applause emulation by character 22 is attained. In addition to this animated applause action, head 33 of character 22 is moved vertically up and down in order to provide the approving, nodding action.

In order to provide a response for incorrect answers, animated character 22 is constructed to pivot head 33 thereof about the central axis of body portion 30 through an arc of rotation which moves head 33 from side to side. As depicted in FIG. 3, head 33 is shown at one end of its arc of movement, with the head substantially facing forward adjacent the right shoulder of body portion 30. FIG. 4 depicts the opposed position of head 33, wherein head 33 has been pivoted to be forwardly facing substantially over the left shoulder of body portion 30. By providing this side-to-side arcuate movement of head 33, animated character 22 produces the impression of shaking its head from side to side in a conventional "no" motion. In this way, the desired animation for character 22 is provided.

As is more fully detailed below, the animated movement of character 22 is controlled by incorporating motor means within body portion 30 of character 22, with the motor being employed to directly control the movement of arm 31 and head 33. In order to activate the motor to produce the desired movement in response to the child's input, the motor contained within body portion 30 is electrically connected to prongs 34 and 35, shown in FIGS. 3, 4 and 5 as extending from the base of animated character 22. Prongs 34 and 35 are constructed for mating engagement in socket 36 of housing 21 and incorporate conductive portions whereby the appropriate signal is transmitted to the motor by the circuitry contained in housing 21.

Figure 1:
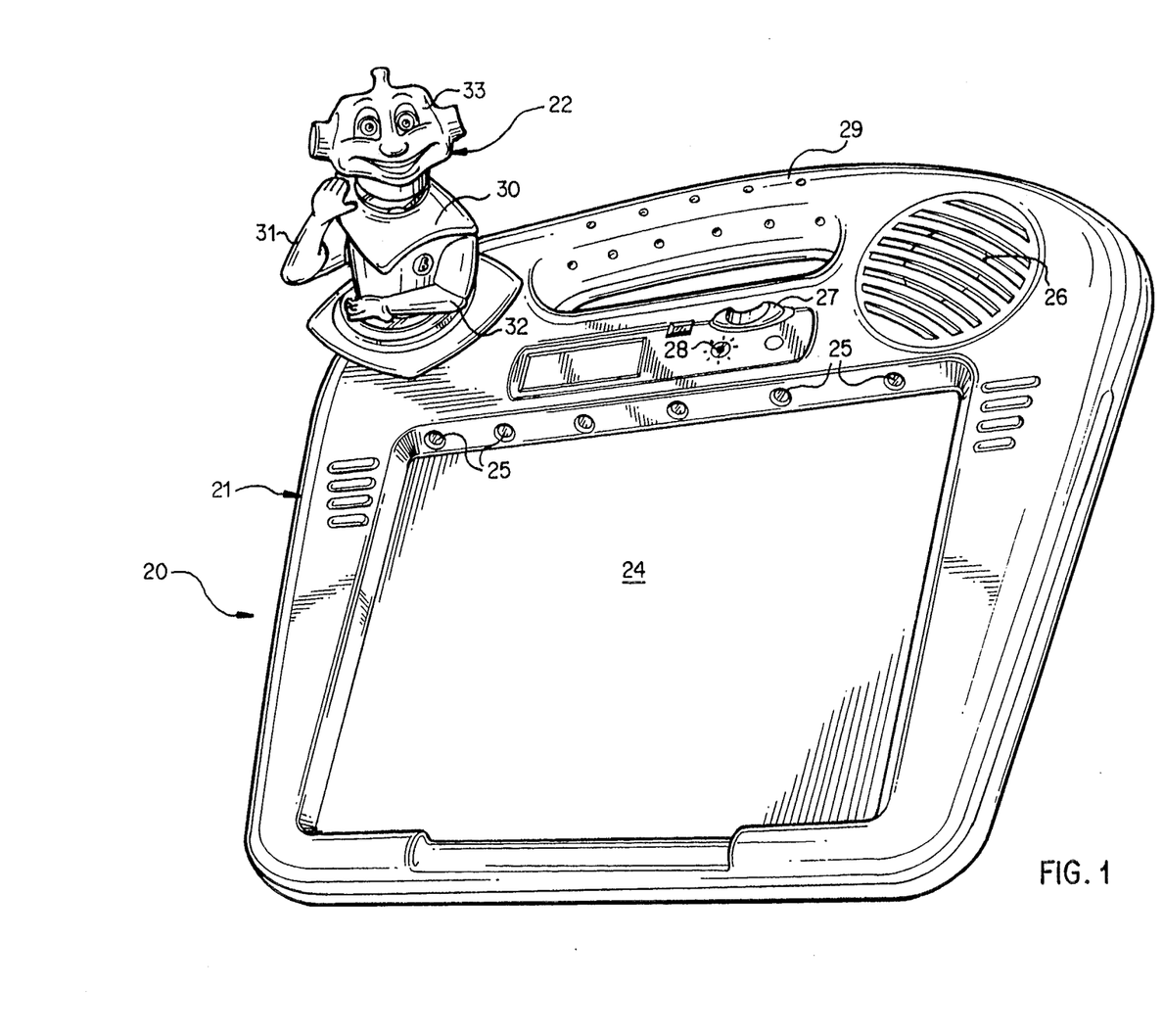
FIG. 1 is a perspective view of the animated electronic educational game of the present invention with the animated character mounted in place.
Figure 2:
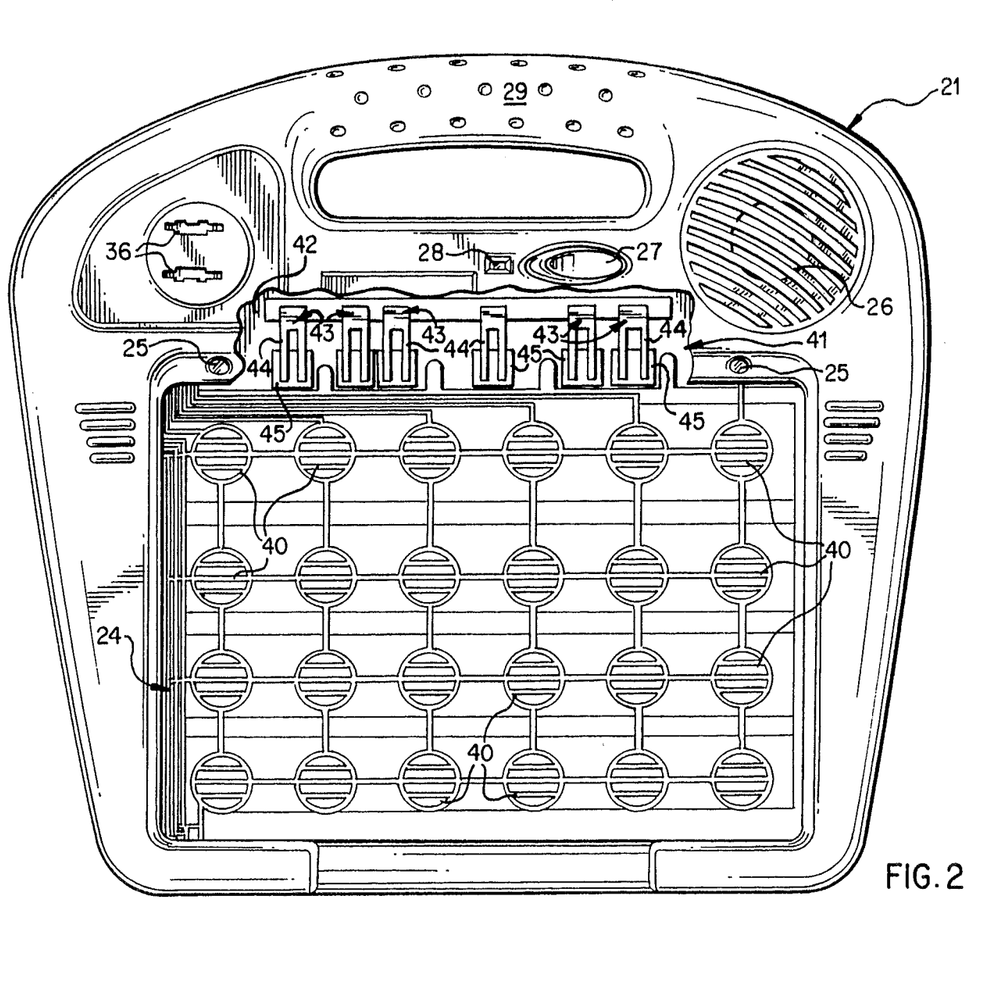
FIG. 2 is a top plan view, partially broken away, of the animated electronic educational game of the present invention with the animated character removed therefrom and the input panel exposed.

In FIG. 2, input panel 24 of housing 21 is depicted in its preferred embodiment as comprising an array of independent, pressure-responsive, signal generating input zones 40. Each input zone 40 is connected to the control circuitry mounted within housing 21 for being processed, based upon the criteria established by the control circuitry.

Figure 7:
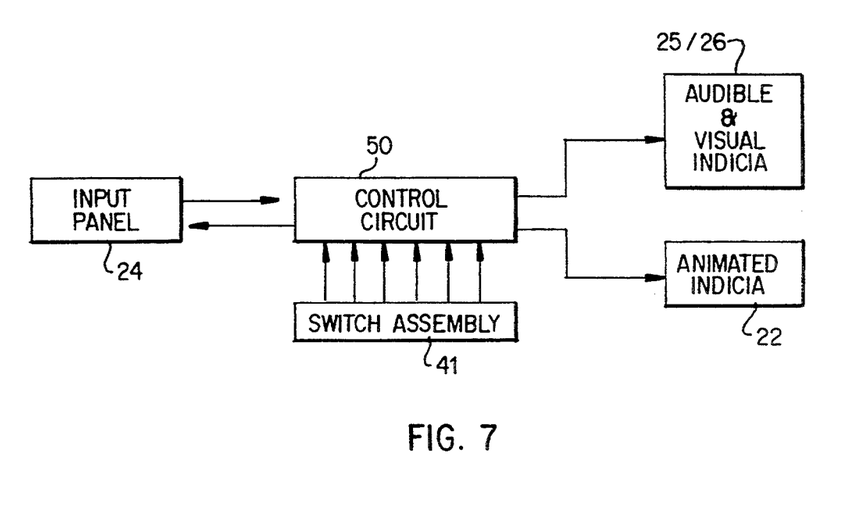
FIG. 7 is a schematic block diagram showing the electronic circuitry employed in controlling the animated electronic educational game of the present invention.
Figure 8:
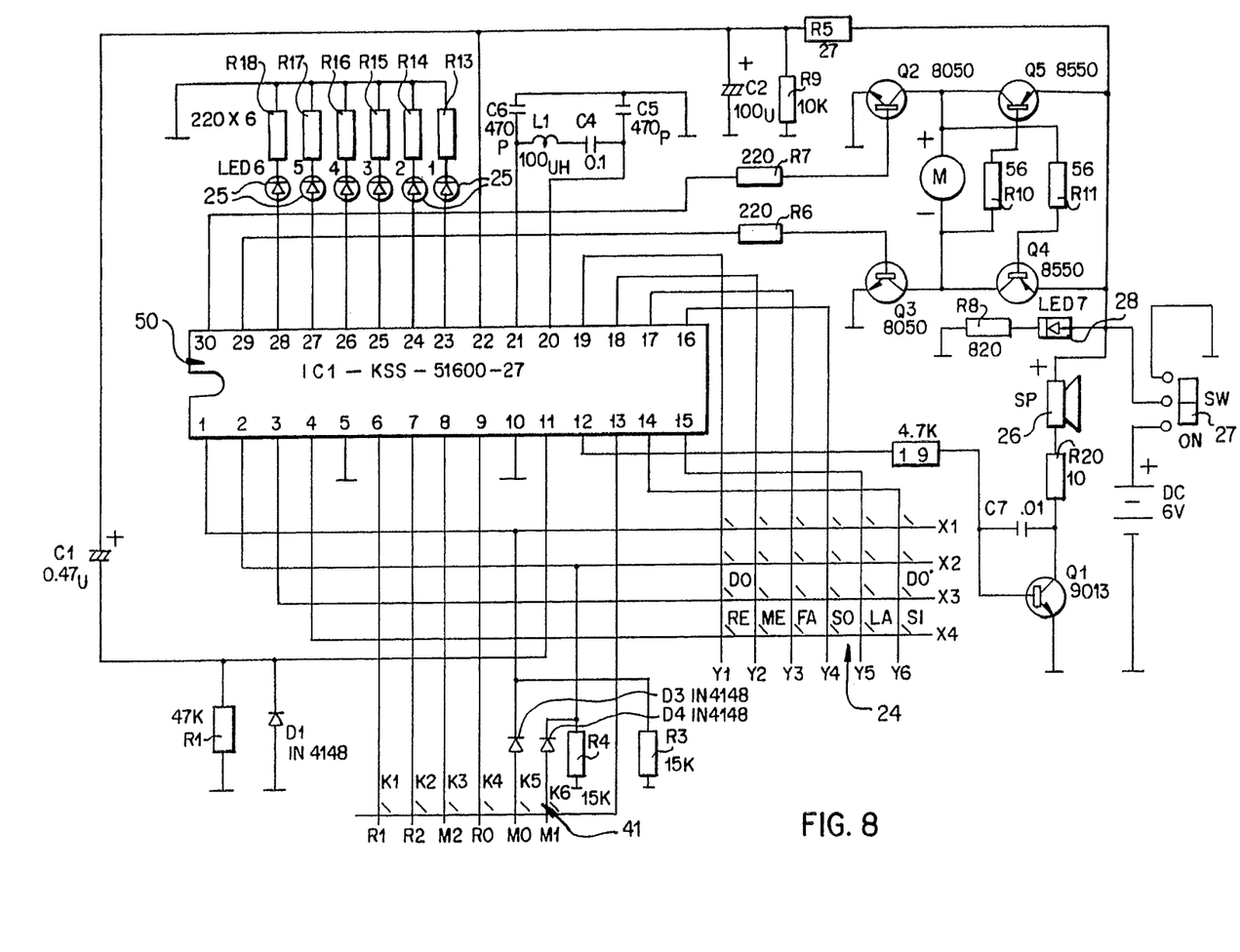
FIG. 8 is a detailed electronic diagram depicting the preferred circuit construction for the animated educational game of the present invention.

In order to better understand the construction and operation of animated electronic educational game 20 of the present invention, reference should also be made to FIG. 7 wherein a schematic block diagram of the electronic operation of the present invention is provided and to FIG. 8, wherein the preferred circuit construction is provided. As shown therein, control circuit 50 is constructed to receive all of the various inputs and provide output signals for activating the audible and visual indicia, such as LED's 25 and speaker 26 as well as activating the animated indicia 22. In order to assure ease of operation and control, circuit 50 is mounted within housing 21.

In order to enable animated, electronic educational game 20 to provide a plurality of alternate input zone combinations for designating a correct response, control circuit 50 incorporates accessible memory means, wherein a plurality of separate and distinct preset pattern arrangements are contained. In this way, a plurality of separate and distinct paired input zones 40 are provided achieving a plurality of different patterns designating correct response zones for one particular question zone. As a result, a plurality of game cards can be constructed wherein one particular question zone would have different paired answer zones associated therewith, depending upon the particular game card employed. By employing this construction, substantially enhanced versatility is achieved and easily determined, automatic response patterns are prevented, thereby assuring that the child must properly answer a question in order to attain the desired positive responses.

In the preferred embodiment, as is further amplified below, game cards are constructed for overlying cooperating engagement with input panel 24. In this regard, game cards preferably comprise a single area, such as the top row of input zones 40, as the area in which all of the questions repeatedly appear on each game card. However, with control circuit 50 incorporating a plurality of preset patterns, the remaining rows of input zones comprise all of the available zones for answers to the questions being asked. Consequently, with a plurality of zones available and with control circuit 50 comprising a plurality of alternate preset configurations, a correct zone associated with one particular question zone can be easily varied in different game cards. The resulting game is more challenging, requiring each question to be separately analyzed and properly answered without automatic areas being selected without knowing the accuracy of the particular response.

In the preferred embodiment, housing 21 of animated electronic educational game 20 incorporates switch assembly 41 which is position in cooperating association with input panel 24. As depicted in FIGS. 2, 7, and 8, switch assembly 41 is positioned along the top edge of input panel 24 and is connected to control circuit 50.

Switch assembly 40 preferably comprises a support panel 42 on which a plurality of switches 43 are mounted. Each switch 43 comprises a spring biased arm 44 and a contact plate 45. One end of each spring biased arm 44 is maintained in contact with its associated, independent contact plate 45 due to the inherent biasing forces of arms 44, with contact plate 45 connected to control circuit 50. The opposed end of each arm 144 is connected to complete the circuit of the switch, enabling an "on" signal to be transmitted whenever arm 44 contact plate 45. As detailed below, one or more switches 43 may be open, by inserting a non-conductor between arm 44 and plate 45. In this instance, an "OFF" signal is transmitted to control circuit 50.

By employing this construction, a plurality of separate and independent switch members are achieved which are constructed for cooperating association with input panel 24. With each switch 43 of switch assembly 41 directly connected to control circuit 50, the ON/OFF status of the switches is sued to select the particular pattern or mode of operation for animated electronic educational game 20.

In order to control the status of switches 43, each game card incorporates tab means formed thereon which are cooperatively associated with switch assembly 41 for controlling the combination of switch members which are activated. The resulting signal is employed by control circuit 50 for designating the particular pattern which represents the correct combination of input zones 40 for representing the proper response to each particular question. In this way, the desired variability is attained in a completely controlled and easily executed construction.

Figure 6:
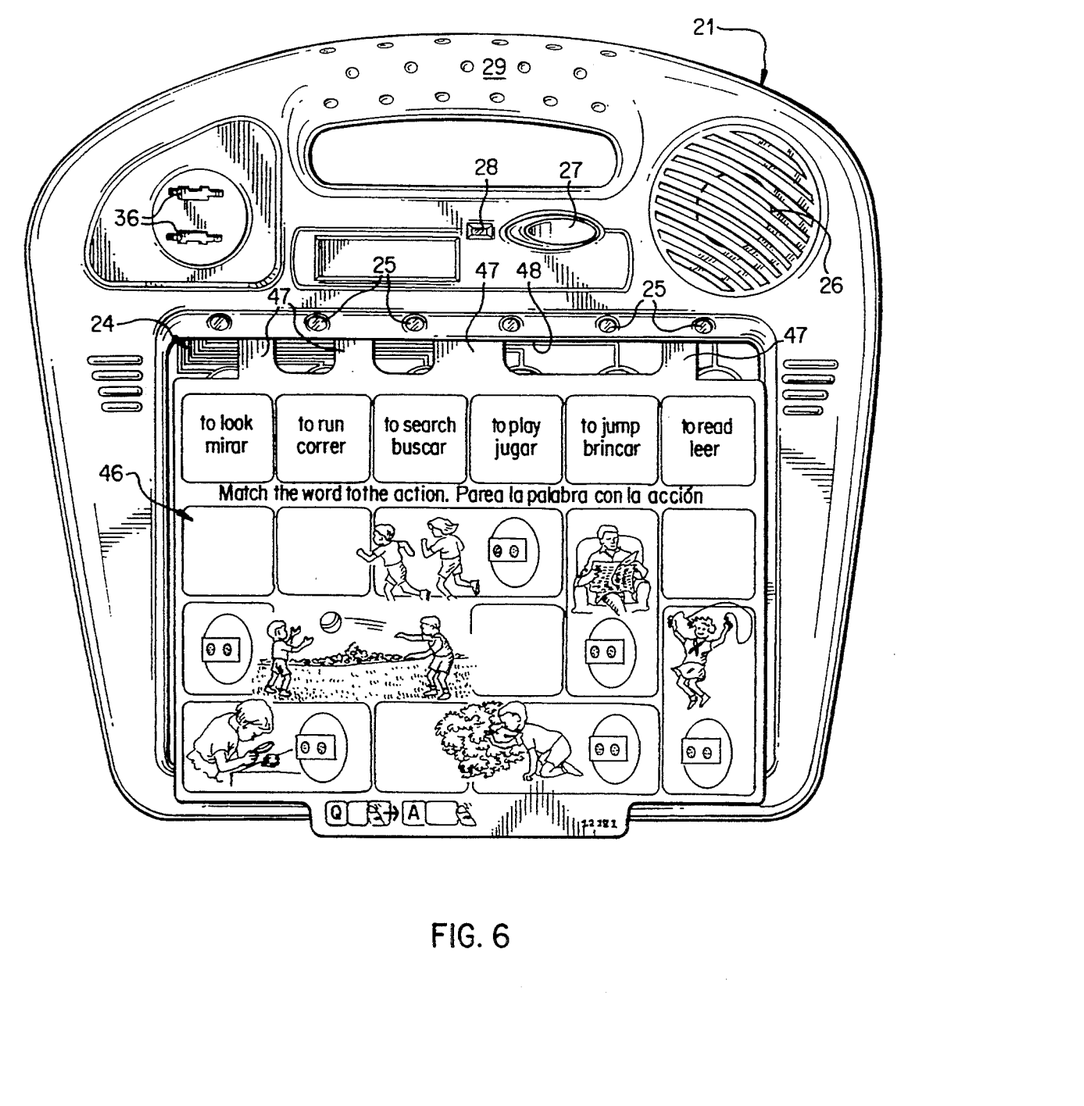
FIG. 6 is top plan view of the animated electronic educational game of the present invention with the animated character removed and a game card in the process of being inserted into position.

In FIG. 6, housing 21 of animated electronic educational game 20 of the present invention is depicted with a typical game card 46 in the process of being inserted into cooperative association with housing 21. As shown in this representative example of a typical game card 46, the top row of the game card represents a plurality of different questions, with other zones designated as the different appropriate responses for each question. In addition, game card 46 incorporates along the top edge thereof a plurality of tabs 47 extending therefrom. Tabs 47 are constructed for cooperative sliding interengagement with housing 21 through an elongated slit 48 formed in housing 21 directly between LED's 25 and input panel 24.

Once game card 46 has been slid into full interengagement within elongated slot 48 of housing 21, tabs 47 of game card 46 are brought into contact with some or all of the switches 43 forming switch assembly 41. By employing this construction, the presence of a tab 47 which cooperates with a switch 43 causes the switch 43 to produce an open signal, since extension tab 47 will be placed between spring arms 44 and contact plate 45. In those areas where an extension tab 47 is absent, the particular switches 43 will produce a closed signal to control circuit 50, since spring arms 44 are maintained in contact with plate 45.

Control circuit 50 receives the signals from switches 43 and employs the information for selecting the particular pattern which represents the correct answers for particular questions. In this way, animated electronic educational game 20 of the present invention is assured of providing the correct responsive indicia for each and every game card employed therewith. Although it is preferred that the first row of input zones 40 of input panel 24 is universally employed for questions, with the remaining input zones 40 being employed for alternate answer zones, it is apparent to one of ordinary skill in the art that any desired pattern can be incorporated into the present invention for providing any results desired.

Once a particular game card 46 has been properly positioned in housing 21 of animated electronic educational game 20, with the appropriate switches 43 of switch assembly 41 transmitting the requisite information to control circuit 50 for properly analyzing the particular game card 46 positioned therewith, animated electronic educational game 20 is ready for operation. Whenever a child employing game 20 matches the appropriate question and answer combination, control circuit 50 recognizes that a correct response has been made and transmits a signal to LED's 25 and speaker 26 to produce the desired audible and visual response for a correct answer. In addition, control circuit 50 also transmits the appropriate signal to socket 36 and pins 34 and 35 in order to cause animated character 22 to produce the desired animation consistent with a correct answer.

Similarly, whenever a question is answered incorrectly, control circuit 50 transmits the appropriate signal to animated character 22 in order to cause the animation for an incorrect answer to be produced.. If desired, appropriate signals are transmitted to LED's 25 and speaker 26 for indicating sounds or displaying lights consistent with erroneous answers.

As is apparent from the foregoing detailed disclosure, the present invention provides a substantially improved, unique animated electronic educational game which enhances a child's interest and excitement with the use of an educational game. By employing a readily identifiable, friendly character which is constructed to produce animated movements in response to both correct and incorrect answers, a child is drawn to play with game 20. In addition, the child is encouraged, challenged, and continuously excited by the positive reinforcement that is continuously provided by the animated movements of character 22 for both correct or incorrect answers. As a result, game 20 substantially improves and enhances the educational benefit being provided, while also substantially increasing the play value, interest, and excitement associated with game 20.

In order to provide the desired animated indicia for enhancing excitement in the use and operation of animated electronic educational game 20 of the present invention, animated character 22 is constructed to provide the particular responsive movements detailed above. By referring to FIGS. 9 and 10 along with the following detailed disclosure, the construction and operation of the preferred embodiment for attaining the desired animated movement of character 22 will best be understood. However, as fully explained herein, the incorporation of motor means and movement controlling cam and actuator means are employed to attain the desired animated movement to provide this unique added dimension to the electronic educational game of the present invention. It is to be understood that the construction details for attaining the desired animation represents one preferred embodiment for attaining the desired result and is not intended to preclude alternate constructions that can be employed without departing from the scope-of the present invention.

Figure 9:
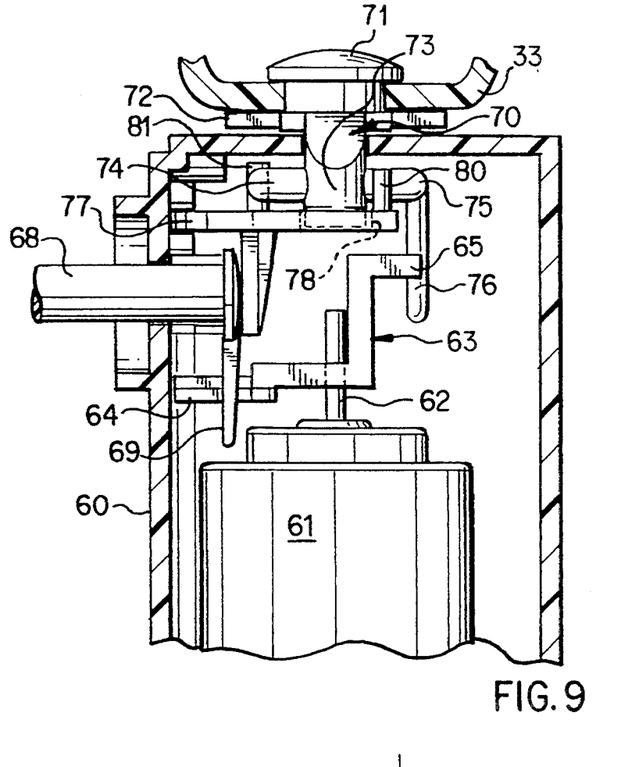
FIG. 9 is a cross-sectional side elevation view of the motor housing employed for animating the character.

In FIG. 9, housing 60 is depicted within which is mounted motor 61 and the animation assembly associated therewith. Motor 61 incorporates elongated shaft 62 extending therefrom which is controllably journalled with movement controlling pin 63.

In the preferred embodiment, motor 61 comprises a motor capable of rotating shaft 62 through a limited arcuate distance in a first direction in response to the receipt of a first signal and rotate shaft 62 through a similar arc of rotation in the opposite direction in response to the receipt of a second actuation signal. In each instance, shaft 62 is automatically returned to its original position after rotation through its arcuate distance. This is clearly depicted in FIG. 10 wherein the normal position for movement control pin 63 is shown in solid, while one of its arcuately moved positions is depicted in phantom.

Figure 10:
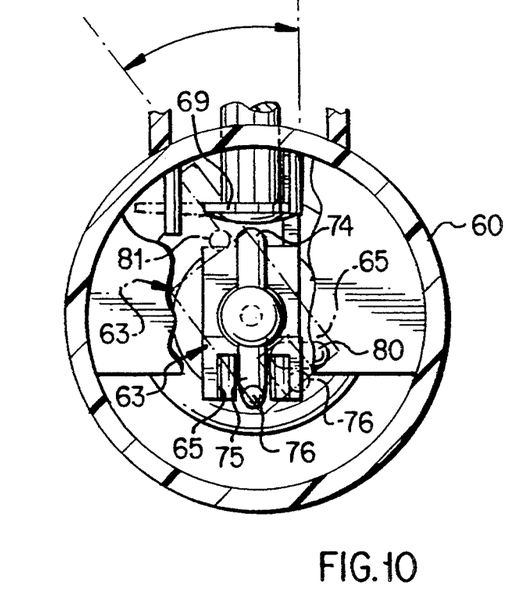
FIG. 10 is a cross-sectional top view of the motor housing taken along line 10—10 of FIG. 9.

Movement control pin 63 is mounted to shaft 62 and is constructed to rotate therewith about the axis of shaft 62. In addition, movement control pin 63 directly controls the movement of head 33 and arm 31 of animated character 22. In its preferred embodiment, movement control pin 63 comprises a radially extending arm 64 formed at one end thereof, while also comprising a forked dual finger end 65 formed at the opposed end thereof.

Also mounted to housing 60 is an arm engaging shaft 68 which is journalled for rotation with housing 60, with the terminating end thereof incorporating a control lever 69. The opposed end of shaft 68 is mounted to arm 31 of character 22 and controls the movement of arm 31.

As shown in FIGS. 9 and 10, lever 69 is positioned for being maintained in contact with radial arm 64 of movement control pin 63. By employing this construction, the rotational movement of control pin 63 in the direction shown in FIG. 10 causes radial arm 64 to move arcuately forcing lever 69 to be simultaneously pivoted therewith. The movement of lever 69 causes shaft 68 to rotate about its central axis.

Since shaft 68 is directly connected to arm 31 of character 22, the rotation of shaft 68 causes arm 31 to be raised. In this way, the activation of motor 61 to cause shaft 63 to pivot in the direction shown in FIG. 10 produces the desired raising of arm 31 to produce the animation desired for emulating applause by character 22 for responding to receipt of correct answers.

As is evident from this disclosure, the rotation of shaft 62 in the opposite direction is in response to the receipt of a wrong answer. In this event, radially arm 64 moves arcuately in the opposite direction, away from lever 69. As a result, no movement of arm 31 is obtained, as desired, for incorrect answers.

In completing the assembly to produce the desired motion for head 33 of character 22, a head control member 70 is cooperatively associated therewith. As shown in FIG. 8, head control member 70 comprises a mounting post 71 which extends outwardly from housing 60 and comprises a retaining post about which head 33 is securely mounted. In addition, a shoulder portion 72 is also incorporated as part of control member 70 for assisting in securely maintaining head 33 in the desired mounted position as well as assisting in the controlled movement thereof.

The construction of head control member 70 is completed by incorporating therewith a centrally disposed, generally cylindrically shaped column 73 which is substantially coaxially aligned with mounting post 71. In addition, two radially extending, generally cylindrically shaped support ribs 74 and 75 extend coaxially from column 73 with movement controlling finger 76 extending substantially perpendicularly from the terminating end of rib 75.

The construction of housing 60 is completed by support plate 77 which is mounted in housing 60 in association with head control member 70 for supportingly maintaining head control member 70 in the desired position for enabling control member 70 to achieve the desired movement thereof. In this regard, support plate 77 comprises an enlarged hole 78 for loosely receiving the base of column 73. In addition, plate 77 also incorporates upstanding bosses 80 and 81 which are positioned for cooperating engagement with ribs 74 and 75 and are employed to allow control member 70 to arcuately move freely in one direction, while resisting the arcuate movement of control member 70 in the opposite direction.

With the movement control components detailed above fully assembled in housing 60 to provide the desired controlled animation of character 22 head portion 33 of character 22 is controllably moved by the rotation of shaft 62 of motor 61. In this regard, when shaft 62 rotates in the direction to cause head 33 to move from side to side, the forked dual finger end 65 of movement control pin 63 causes finger 76 of head control member 70 to move therewith, since finger 76 is captured between forked dual finger end 65.

As movement control pin 63 moves in this direction, which is opposite to the direction depicted in FIG. 10, control finger 76 causes head control member 70 to pivot about its central axis while contained within holes 78 of support plate 77. With head 33 securely affixed to mounting post 71 of head control member 70, the arcuate pivoting of control member 70 about its central axis causes head 33 to move from side to side providing the animated appearance of character 22 shaking its head in a "no" manner. In this way, the desired response for the receipt of an incorrect answer is provided. As discussed above, the movement of control pin 63 in this direction does not affect shaft 68 and lever 69, thereby no movement of arm 31 of character 22 is attained.

In order to attain the desired vertical nodding of head 33 of character 22, shaft 62 of motor 61 is activated to move in the opposite arcuate direction, which will simultaneously cause arm 31 of character 22 to be raised for attaining the animated applauding motion. Simultaneous with the raising of lever 69 of arm engaging shaft 68, the forked, dual finger end 65 of control pin 63 causes control finger 76 of head control member 70 to be moved simultaneously therewith in the manner depicted in FIG. 10. In view of the weight distribution of head 33 on control member 70 in combination with the capture of radially extending cylindrical support ribs 74 and 75 by upstanding bosses 80 and 81 on plate 77, the movement of distally positioned finger 76 causes head 33 to rock forwardly on the bearing surfaces of cylindrical support ribs 74 and 75 with plate 77. As a result, the rotation of head control member 70 is prevented and the movement of finger 76 in this direction causes head control member 70 to tilt forwardly, with head 33 of character 22 mounted thereon. As a result, the vertical nodding or approving animated motion is realized and character 22 produces the desired approving nod simultaneously with movable arms 31 providing the animated applause motion.

As detailed above, shaft 62 automatically returns to its original position as soon as its arcuate movement in either direction has been completed. In this way, the system is immediately ready for the next cycle, while also completing the motion of head 33 and arm 31.

By employing the construction detailed above for attaining the desired animated motion of character 22, the completely responsive animated motion of character 22 is realized in an economically produced manner. However, although this construction is preferred, alternate constructions can be employed without departing from the scope of this invention.

In addition, it is also understood that a wide variety of animated indicia can be employed in accordance with this invention, without departing from the scope or the spirit thereof. As a result, the use of character 22 is merely exemplary, while any desired animated figure or construction can be employed for providing responsive visually pleasing animation to a child using the game or toy of the present invention without departing from the scope of the present invention. Consequently, all variations are intended to be encompassed within the scope of this invention.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

Having described my invention, what I claim as new and desire to secure by Letters Patent is:

1. A unitary, portable, self-contained animated educational and entertainment game/toy constructed for encouraging continued use by children, said game/toy comprising    A. a housing incorporating audible indicia and visual indicia activated in response to the receipt of control signals;

B. an input panel formed on the housing for producing a plurality of signals in response to user activation thereof;

C. control means mounted in the housing for receiving the signals from the input panel and producing first control signals for activating the audible and visual indicia;

D. an animatable three-dimensional character
     a. removably mounted to the housing,
     b. controllably connected to the control means for producing animated movements in response to receipt of control signals from the control means, said control signals being produced in response to specific user initiated input signals and
     c. constructed for producing a first animated response representing the receipt of input signals consistent with a correct answer and a second animated response different from said first animated response and representing receipt of input signals consistent with an incorrect answer; and    E. a plurality of game cards constructed for overlying cooperating interrelationship with the input panel and comprising a plurality of separate zones each of which is aligned with an input zone of the panel and contains indicia representing a question or an answer, whereby the user is able to produce the desired input signal by pressing the particular question zone followed by pressing of the answer zone related thereto;

whereby an animated toy/game is attained which provides animation directly responsive to the input provided by the user.

2. The animated educational and entertainment game/toy defined in claim 1, wherein the input panel is further defined as comprising a plurality of independent pressure-responsive signal-generating input zones each of which produce an independent signal upon activation and transmits said signal to the control means.

3. The animated educational and entertainment game/toy defined in claim 2, wherein the signals produced by the input panel upon activation of at least two input zones represents a question and a responsive answer.

4. The animated educational and entertainment game/toy defined in claim 3, wherein different animated responses are produced by the animatable character depending upon the accuracy or inaccuracy of the input signals representing the question and answer.

5. The animated educational and entertainment game/toy defined in claim 2, wherein the activation of a single zone generates an automatic response.

6. The animated educational and entertainment game/toy defined in claim 5, wherein the automatic response comprises simultaneous generation of the audible indicia, the visual indicia, and the animatable character.

7. The animated educational and entertainment game/toy defined in claim 1, wherein each game card is further defined as comprising system activation means for designating a particular question and answer pattern, thereby enabling a single question position to effectively have different answer positions appear totally random when different cards are employed.

8. The animated educational and entertainment game/toy defined in claim 7, wherein said housing is further defined as comprising switch means connected to the control means and said game cards are further defined as comprising tab portions extending therefrom for cooperating interengagement with said switch means, whereby the output from said plurality of switch means is transmitted to the control means for designating the particular pattern for the selected game card.

9. The animated educational and entertainment game/toy defined in claim 1, wherein the animated movement of the animatable character is produced by a single motor member mounted in association with the animatable character and cam means associated therewith.

10. The animated educational and entertainment game/toy defined in claim 9, wherein said motor is further defined as comprising a shaft extending therefrom which is controllably movable in a first direction in response to receipt of a first control signal and is controllably movement through a similar arc of rotation in the opposite direction in response to the receipt of a second control signal.

11. The animated educational and entertainment game/toy defined in claim 10, wherein said first control signal is transmitted to the motor in response to the receipt of a correct answer and the second control signal is transmitted to the motor in response to the receipt of an incorrect answer, whereby the motor is capable of producing separate and distinct arcuate motions based upon the accuracy of the input signal received by the control means.

12. The animated educational and entertainment game/toy defined in claim 11, wherein the animatable indicia is further defined as comprising a three dimensional character depicted with a head, a movable arm, and a fixed arm and said movement of the motor shaft in a first direction causes lever means connected to the movable arm to produce the visual appearance of the character applauding.

13. The animated educational and entertainment game/toy defined in claim 12, wherein the shaft movement causes the movable arm to be raised with the arm being lowered by gravity to bring the hand of the movable arm in contact with the hand of an immovable arm, thereby providing the visual animation of applause.

14. The animated educational and entertainment game/toy defined in claim 11, wherein movement of the motor shaft in the second direction directly causes the head of the character to move from side to side, providing an animated visual appearance of the character shaking its head.

15. The animated educational and entertainment game/toy defined in claim 14, wherein said movement of the shaft in the second direction is in response to the receipt of signals representing an improper response, whereby the animated appearance of the character shaking its head visually represents a conventional "no" response.

16. The animated educational and entertainment game/toy defined in claim 11, wherein said movement of the shaft in the first direction causes the head of the character to move vertically, up and down, in a conventional nodding fashion indicating approval.

17. The animated educational and entertainment game/toy defined in claim 1, wherein said animatable three-dimensional character is further defined as being constructed with plug means formed therewith for mounted interengagement with the housing, thereby connecting the three-dimensional character with the control means contained within the housing, whereby said three-dimensional character is quickly and easily removed from or attached to the housing for controlled operation thereby.

* * * * *